United States Patent [19]

Kennedy et al.

[11] 4,327,201

[45] Apr. 27, 1982

[54] CATIONICALLY POLYMERIZABLE MACROMOLECULAR MONOMERS AND GRAFT COPOLYMERS THEREFROM

[75] Inventors: Joseph P. Kennedy, Akron; Kurt C. Frisch, Jr., Midland, both of Mich.

[73] Assignee: The University of Akron, Akron, Ohio

[21] Appl. No.: 199,656

[22] Filed: Oct. 22, 1980

[51] Int. Cl.³ .......................................... C08F 110/10
[52] U.S. Cl. .................................... 526/131; 526/164; 526/185; 526/187; 526/188; 526/237; 526/251; 526/293; 526/348.7; 525/319; 525/335; 525/359
[58] Field of Search ............... 526/185, 187, 188, 131, 526/138, 164, 237, 248.7

[56] References Cited

U.S. PATENT DOCUMENTS

| | | | |
|---|---|---|---|
| 3,560,458 | 2/1971 | Kennedy et al. | 526/185 |
| 3,562,804 | 2/1971 | Powers | 260/85.3 |
| 3,850,895 | 11/1974 | Priola et al. | 260/85.3 R |
| 3,965,078 | 6/1976 | Priola et al. | 526/154 |
| 4,029,866 | 6/1977 | Kennedy | 526/185 |
| 4,154,916 | 5/1979 | Wagensommer et al. | 526/185 |

*Primary Examiner*—Carman J. Seccuro
*Attorney, Agent, or Firm*—Oldham, Oldham, Hudak & Weber Co.

[57] ABSTRACT

The method and production of macromolecular monomers from cationically polymerizable monomers and vinyl-substituted hydrocarbon halides is disclosed. These cationically polymerizable monomers may react in the presence of a catalyst with the hydrocarbon halide to produce a macromer retaining a polymerizable headgroup. This compound may be used in a variety of copolymerization processes with a variety of copolymerizable monomers to form graft copolymers.

18 Claims, 4 Drawing Figures

Synthesis of Polyisobutylene Macromer — Conversion vs Time

Representative UV Spectra Used to Calculate Head Group Concentration

Selected NMRs of Polyisobutylene, Polybutyl Acrylate and Poly(butyl Acrylate-g-isobutylene)

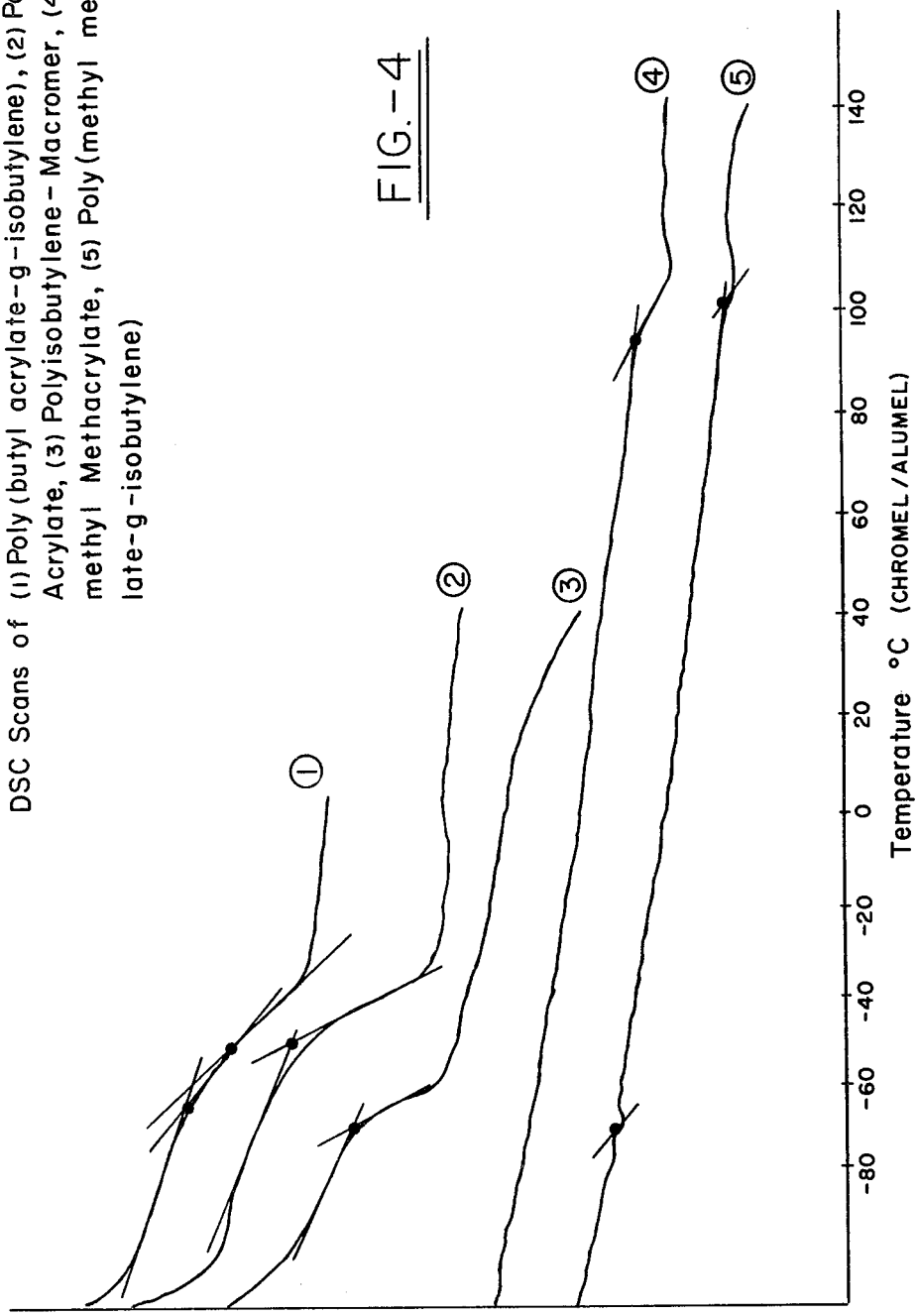

CATIONICALLY POLYMERIZABLE MACROMOLECULAR MONOMERS AND GRAFT COPOLYMERS THEREFROM

TECHNICAL FIELD

This invention relates to the production of macromolecular monomers from cationically polymerizable monomers and vinyl-substituted hydrocarbon halides, which may be used in copolymerization with copolymerizable monomers to form a graft copolymer.

BACKGROUND ART

Macromolecules carrying a readily polymerizable headgroup on a polymerization-inactive chain have been demonstrated to yield valuable macromolecular monomers. These macromolecular monomers, abbreviated in the art to macromers, may copolymerize with conventional monomers to produce graft copolymers. This method of macromer copolymerization has been described by the following reaction:

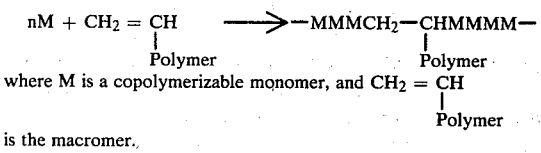

where M is a copolymerizable monomer, and $CH_2 = CH \atop | \atop Polymer$ is the macromer.

To the knowledge of the inventors, the production of macromers by direct one-step synthesis has been mainly through use of an anionic mechanism such as that disclosed by U.S. Pat. Nos. 3,989,768; 3,879,494; 3,786,116; and 3,832,423. Various disclosures in the art are found in Volume 101 Makromolecular Chemistry 104 (1967), Journal of Paint Technology 46, 596, 16 (1974), Journal of Applied Polymer Science, 14, 167 (1970), and Polymer Bulletin 1, 575–580. (1979).

The production of macromers using anionic techniques neglects many monomers which can be synthesized by carbocationic techniques. Therefore, the need exists for a reaction system to synthesize macromers from cationically polymerizable monomers, useful in macromer copolymerization to form graft copolymers.

DISCLOSURE OF INVENTION

Therefore, it is an object of the invention to provide a cationically prepared macromolecular monomer, macromer.

It is another object of the invention to provide a cationically prepared monomer, as above, having polymerizable headgroups.

It is yet another object of the invention to provide a cationically prepared macromer having polymerizable headgroups produced from the reaction of a vinyl-substituted hydrocarbon halide and a cationically polymerizable monomer.

Still another object of the invention is to provide a graft copolymer produced from a copolymerizable monomer and the cationically prepared macromer described above.

Yet another object of the invention is to provide a graft copolymer as above, wherein any copolymerizable monomer may copolymerize with the cationically prepared macromer at the polymerizable headgroups.

Yet another object of the invention is to provide a method for the production of a cationically prepared macromer having polymerizable headgroups.

It is yet another object of the invention to provide a method for the production of a graft copolymer produced from the reaction of a cationically prepared macromer and a copolymerizable monomer.

These and other objects of the invention, which will become more apparent as the detailed description of the best mode for carrying out the invention proceeds, are achieved by a composition of matter, comprising: a cationically prepared macromolecular monomer.

The objects of the invention are also achieved by a composition of matter, comprising: poly (X—g—Y) where X is a copolymerizable monomer and where Y is a cationically prepared macromolecular monomer.

The objects of the invention are also achieved by a method for the production of a cationically polymerized macromer comprising: charging from about 5.0 moles to about $1 \times 10^{-5}$ moles of a vinyl-substituted hydrocarbon halide into a vessel containing about 1 mole of a cationically polymerizable monomer and about 1.0 moles to about $1.0 \times 10^{-5}$ moles of a cationic polymerizing catalyst, and reacting said hydrocarbon halide and said monomer in the presence of said catalyst at a temperature from about $-100$ degree C to about 30 degrees C and under $N_2$ atmosphere to form a cationically prepared macromolecular monomer.

The objects are also achieved by a method for the production of a graft copolymer by macromer copolymerization, comprising: charging from about $5.0 \times 10^{-2}$ moles to about $5.0 \times 10^{-7}$ moles of a cationically prepared macromolecular monomer into a vessel containing about 1 mole of a copolymerizable monomer and about 0.1 moles to about $1.0 \times 10^{-6}$ moles of a catalyst, and copolymerizing said cationically prepared macromolecular monomer and said copolymerizable monomer at a temperature from about $-20$ degrees C to about 180 degrees C to form a graft copolymer of the formula poly (X—g—Y) where X is the copolymerizable monomer and where Y is the cationically prepared macromolecular monomer.

BRIEF DESCRIPTION OF DRAWINGS

For an understanding of the synthesis of the cationically prepared macromer and the graft copolymers therefrom, reference is made to the following figures, wherein:

FIG. 4 is a graph of various DSC scans demonstrating a plurality of glass-transition-temperature data for the graft copolymers of the present invention in comparison with the free-radically polymerizable monomers and the cationically prepared monomer.

BEST MODE FOR CARRYING OUT THE INVENTION

Figure 1:
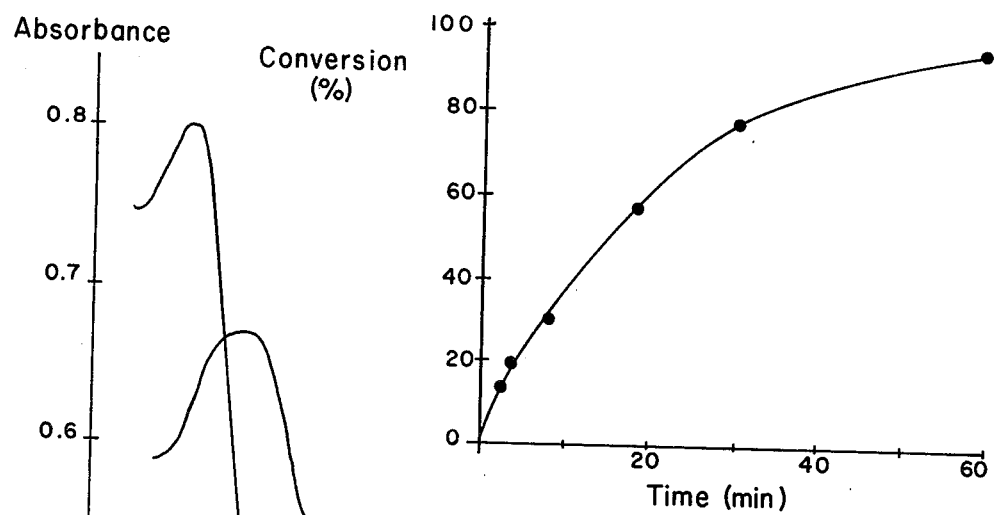
FIG. 1 is a graph demonstrating the conversion of the macromer synthesis plotted against time.

Macromer copolymerization is defined to by the polymerization of a macromer with a copolymerizable monomer. The macromer must have a copolymerizable headgroup for polymerization. This reaction generates a random copolymer comprising a conventionally copolymerizable monomer and the macromer, which, by the incorporation of the latter, introduces a branch to the backbone resulting in the graft copolymer. Thus macromer copolymerization differs from graft copolymerization in the sequence of formation of the backbone relative to the formation of the graft unit.

The limitation of macromer copolymerization to those monomers which are anionically polymerizable places severe restrictions upon cationically polymerizable monomers which would produce desirable graft copolymers. Therefore, a key feature of this invention is to synthesize the macromer from cationically polymerizable monomers carrying unreacted polymerizable headgroups for subsequent copolymerization.

The cationically polymerizable monomers of the present invention may be any monomer capable of cationic polymerization. As such, cationically polymerizable monomers may polymerize to form a unit later identified as the branch of the graft copolymer of the present invention. Examples of cationically polymerizable monomers include isobutylene, styrene, α-methylstyrene, indene, tetrahydrofuran, oxethane, isobutyl vinyl ether.

To generate a macromer having a polymerizable headgroup which survives the polymerization of the cationically polymerizable monomer, it is necessary to use a vinyl or α-substituted vinyl hydrocarbon carrying a tertiary, benzylic, or allylic halide, hereinafter called vinyl-substituted hydrocarbon halide. The hydrocarbon may be aliphatic, aromatic, or combinations thereof, having from 1 to 18 carbon atoms. At one end of this hydrocarbon must be a vinyl or α-substituted vinyl group. At another end of the hydrocarbon must be a group having a tertiary, benzylic, or allylic halide. Examples of the vinyl-substituted hydrocarbon halide of the present invention are vinyl benzyl halide and an allylic halide having the following formula:

where R is a hydrocarbon having from 1–18 carbon atoms, where R' is either H or a hydrocarbon having from 1–18 carbon atoms, where R and R', may be the same and where X=F, Cl, BR, or I.

The reaction of the vinyl-substituted hydrocarbon halide and the cationically polymerizable monomer can be initiated by a variety of Lewis acid catalysts suited for cationic polymerization. These catalysts may be any Friedel-Crafts acids as described in *Friedel-Crafts and Related Reactions* Vol. 1, Interscience, 1963. Examples are trimethylaluminum, triethylaluminum, diethylaluminum chloride, ethylaluminum dichloride, diisobutylaluminum chloride, boron trichloride, and ethylaluminum sesquihalide.

In addition to Lewis acid catalysts, certain heavy metal salts of non-nucleophilic counter anions of the formula ST may be used, where S may be a heavy metal such as Ag, Hg, Cd, or Pb, and where T may be non-nucleophilic counter anion such as $PCl_6^-$, $PF_6^-$, $SbF_6^-$, $SbCl_6^-$, $BF_4^-$, $ClO_4^-$, and $AsF_5^-$.

The reaction of the vinyl-substituted hydrocarbon halide and the cationically polymerizable monomer in the presence of the cationic polymerizing catalyst requires the following reaction concentration: from about 5.0 to about $1.0 \times 10^{-5}$ moles of vinyl-substituted hydrocarbon halide per mole of cationically polymerizable catalysts exists from about 1.0 moles to about $1.0 \times 10^{-5}$ moles per moles of cationically polymerization monomer.

Within these ranges of concentrations, it is desirable to have a concentration of vinyl-substituted hydrocarbon halide from $3.0 \times 10^{-2}$ moles to about $5.0 \times 10^{-4}$ moles per mole of cationically polymerizable monomer. Further, it is desirable to have a concentration of cationic polymerization catalyst from about 0.5 moles to about $1.0 \times 10^{-4}$ moles per mole of cationically polymerizable monomer.

It is preferred to have from about 0.1 moles to about $1.0 \times 10^{-4}$ moles of vinyl-substituted hydrocarbon halide per mole of cationic polymerizable monomer. Further, it is preferred to have from about 0.2 moles to about $1.0 \times 10^{-3}$ moles of cationic polymerization catalyst per mole of cationically polymerizable monomer. Optimally, the concentration of vinyl-substituted hydrocarbon halide is from about 0.01 moles to about 0.005 moles per mole of cationic polymerizable monomer. Optimally, the concentration of the cationic polymerization catalyst is from about 0.1 to about 0.2 moles per mole of cationic polymerizable monomer.

The above ranges of concentration do not reflect the solvent system into which the hydrocarbon, the monomer, and the catalyst are placed. The solvent system may desirably be toluene, dichloromethane, benzene, 1,2-dichloroethane, n-heptane, chlorobenzene, $CH_2Cl_2$, allyl chloride, methyl chloride, and combinations thereof. Preferably, the solvent system is from about 100 percent to about 0 percent of $CH_3Cl$/from about 0 percent to about 50 percent n-heptane. Preferably, the solvent system is about 80 percent $CH_3Cl$/20 percent n-heptane. Desirably, the reaction vessel is closed and maintains a pure nitrogen ($N_2$) atmosphere. The reaction occurs at a temperature from about +30 degrees C to about −100 degrees C and preferably occurs at −60 degrees C.

Of the cationically polymerizable monomers, which include any cationically polymerizable monomer known to those skilled in the art, isobutylene is preferred. Of the vinyl-substituted hydrocarbon halides, including any hydrocarbon halides known to those skilled in the art, vinyl benzyl chloride is preferred. In alternative nomenclature, vinyl benzyl chloride is chloromethylstyrene with the substitution occuring preferably either at the meta or the para position. Of the cationic polymerization catalysts listed, trimethylaluminum is preferred. It has been found that moisture increases the efficiency. The water may exist in a concentration from about 0.0001 moles to 0.01 moles per mole of catalyst added.

In the preferred concentration, using the preferred reactants, under the preferred conditions, a cationically prepared macromer was produced. This cationically prepared macromer is synthesized according to the following reaction process:

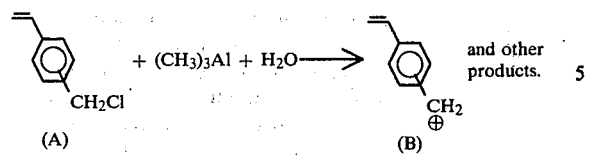

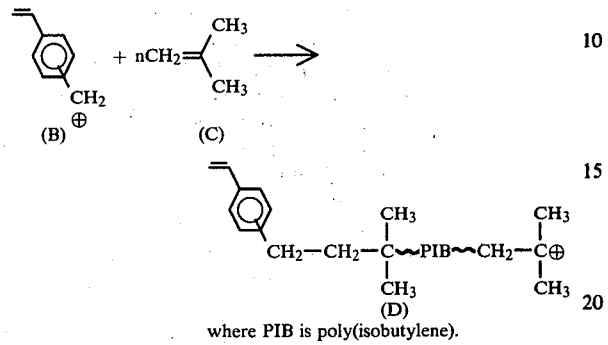

where PIB is poly(isobutylene).

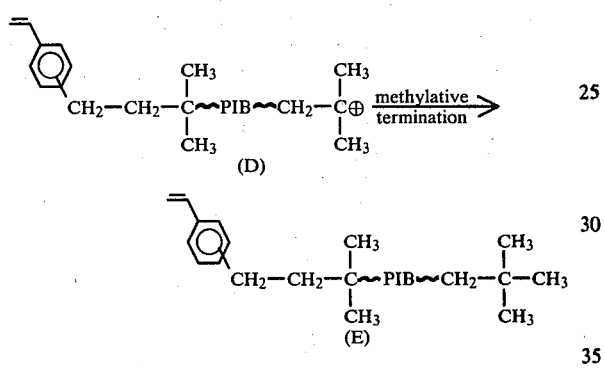

As may be seen by the above chart, vinyl benzyl chloride (A) is ionized by the catalyst to form vinyl benzyl cation (B). This cation then reacts with isobutylene (C) to form poly(isobutenyl styrene) macromer cation (D). Methylation of the cationic site completes the synthesis of the cationically polymerized macromer (E).

It has been found that the rate of polymerization is dependent upon the concentration of the cationically polymerizable monomer, that is to say, the reaction kinetics for the homopolymerization of isobutylene. Therefore, it has been found that about 100 moles of isobutylene per mole of vinyl benzyl chloride will permit homopolymerization of the isobutylene to form the macromer (E).

Crucial to the formation of the macromer (E) is the retention of the polymerizable vinyl headgroup, which serves for random copolymerization with the copolymerization monomer to form the graft copolymer. At any stage during the reaction mechanism described above, it may be possible to have deleterious side reactions which inhibit the formation of the macromer having the vinyl headgroup. Side reactions known are the following

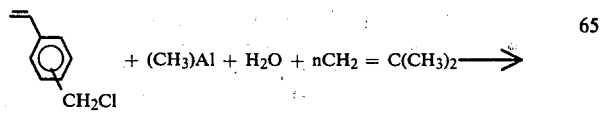

-continued

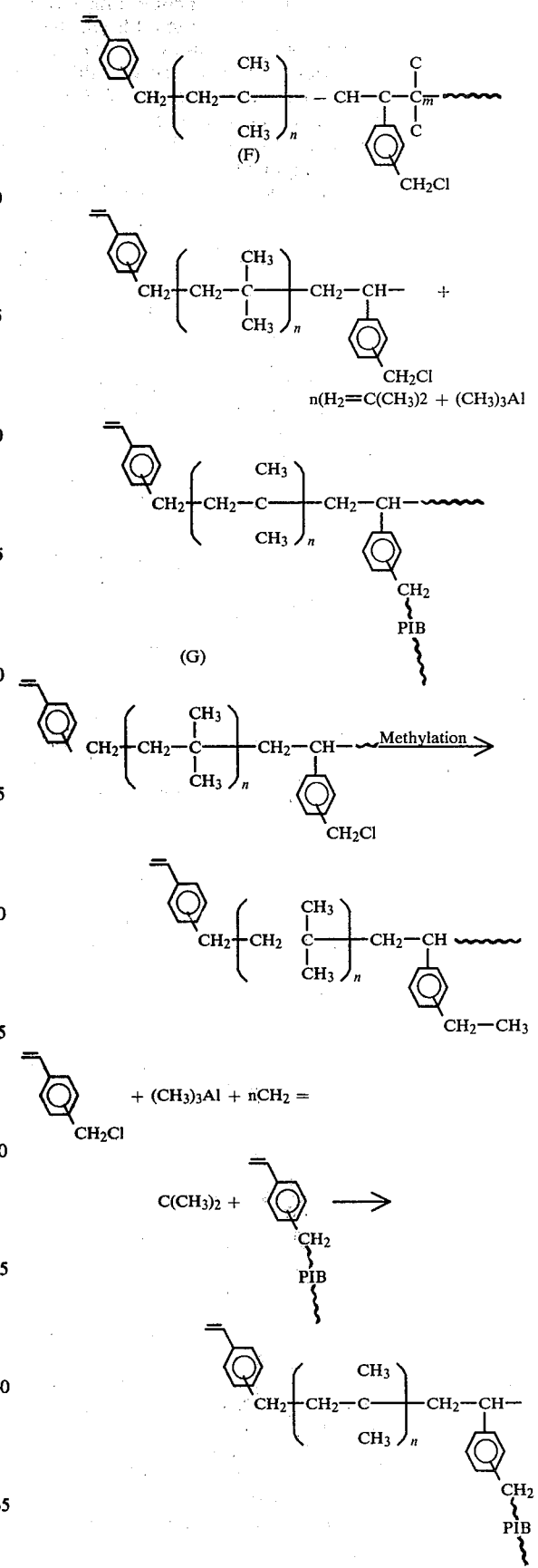

Side reaction (1) indicates the copolymerization of the vinyl-substituted hydrocarbon halide. This undesirable copolymerization removes the vinyl headgroup of that compound from subsequent desirable copolymerization. As seen in reaction (1), not only does this copolymerization remove the hydrocarbon halide from macromer formation but also encumbers the graft by providing an additional undesirable side chain on the graft, such as that seen in compound (F). Further, compound (F), having a reactive halide site may initiate homopolymerization of isobutylene along the chain to form compound (G), further encumbering the graft, as seen in side reaction (2). Otherwise methylation at the halide site forms compound (H), as seen in reaction (3).

Compound (G) may also be produced by the copolymerization of two macromers. As above, this eliminates the availability of the vinyl headgroup for subsequent desirable copolymerization and also creates a branched graft copolymer. As seen in side reaction (4), compound (G) is the same as that produced in reaction (2), except that the homopolymerization of isobutylene has previously occurred.

The macromer is characterized by determining the percentage of vinyl headgroups surviving cationic polymerization by ultraviolet-visible spectral analysis. This spectral analysis offers a comparison of the poly(isobutenyl styrene) in comparison with a known aromatic hydrocarbon having a vinyl headgroup, to wit: ortho, meta, or para methylstyrene. Survival of every vinyl headgroup in the macromer would be indicated by 100 percent retention of vinyl headgroups.

The poly(isobutenyl styrene) was produced according to the preferred concentrations in the preferred solvent concentrations in the preferred atmospheric and temperature conditions. Comparative data utilizing the equation: A=bc provides a direct percentage companion for the following equation:

$$\% \text{ vinyl Headgroup} = \frac{\epsilon \text{ PIB Macromer}}{\epsilon =} \underset{CH_3}{\underset{|}{\bigcirc}} \times 100 = \frac{(A_{PIB})(\overline{M_n})}{\epsilon =} \underset{CH_3}{\underset{|}{\bigcirc}} \times 100$$

$$\frac{(0.67)(2.9 \times 10^4 \text{ g/mole})}{(1.0 \text{ cm})(1.82 \text{ g/ll})} = 84.1\%$$
$$(1.27 \times 10^4 \text{ l/mole} \cdot \text{cm})$$

Figure 2:
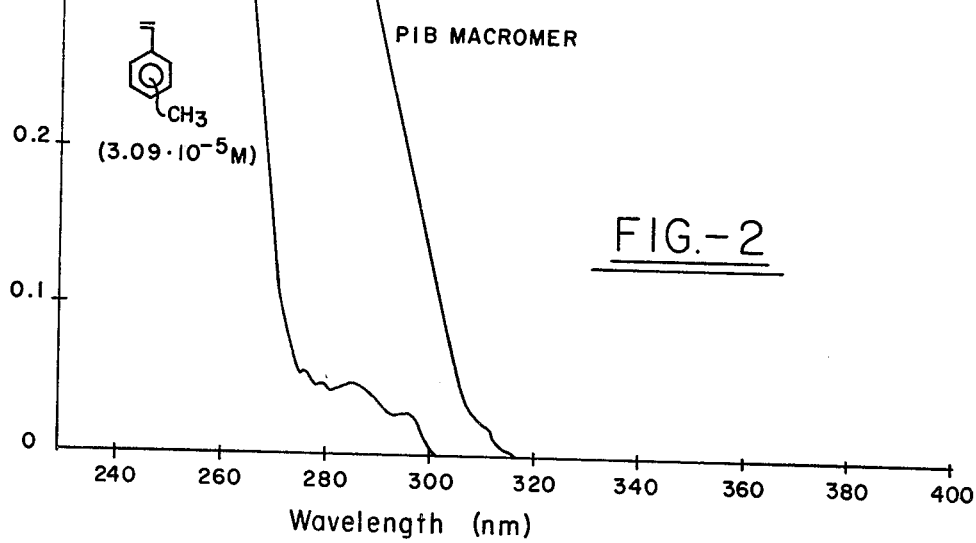
FIG. 2 is a graph demonstrating a comparison of ultraviolet-visible spectral data, comparing the macromer of the present invention with a methyl-substituted sytrene to determine headgroup concentration.

The numerical values for the above equation are computed by measuring the absorbance of the macromer as seen in FIG. 2, calculating the path length in centimeters, determining the density of the macromer, and determining the number average molecular weight of the macromer. The extinction coefficient for the methyl-substituted styrene was determined from known values for an absorbance maximum at 250 nm. This determination indicates that 84 percent of the vinyl headgroups survived the polymerization of the vinyl-substituted hydrocarbon halide with the cationically polymerizable monomer. The remaining 16% of the vinyl headgroups were consumed by one of the undesirable side reactions indicated above. The calculation of Mn was made using GPC equipment, and the molecular weight was well within the desired range from 5,000 to 100,000 suitable for macromolecular monomers. Three other polymerizations using the same concentrations and conditions yielded a percentage efficiency from about 83 to about 90 percent retention of vinyl headgroups.

Following the formation of the cationically prepared macromolecular monomer retaining polymerizable headgroups, it is desirable to polymerize that macromer with a copolymerizable monomer to form a graft copolymer. The copolymerizable monomer may be any monomer capable of copolymerization with the polymerizable headgroup of the macromer, such as free-radical polymerizable monomers, cationic polymerizable monomers, anionic polymerizable monomers, and polymerizable monomers, by coordination mechanisms.

The free-radical polymerizable monomer may be any free-radical polymerizable monomer known to those skilled in the art, including butyl acrylate, methyl methacrylate, acrylonitrile, styrene, vinyl acetate, vinyl chloride, ethyl acetate, vinylidene chloride, and combinations thereof. Of the free-radical polymerizable monomers, it is desirable to use butyl acrylate or methyl methacrylate.

The cationic polymerizable monomers may be any cationic polymerizable monomer known to those skilled in the art, including isobutylene, α-methylstyrene, isobutyl vinyl ether, indene, tetrahydrofuran, oxethane, styrene, various substituted sytrenes and combinations thereof. Of the cationic polymerizable monomers, it is desirable to use sytrene or α-methylstyrene.

The anionic polymerizable monomers may be any anionic polymerizable monomer known to those skilled in the art, including styrene, butadiene, isoprene, α-methylstyrene, and combinations thereof. Of the anionic polymerizable monomers, it is desirable to use styrene or α-methylstyrene.

The coordination polymerizable monomers may be any polymerizable monomers reacting by coordination or Ziegler-Natta mechanisms known to those skilled in the art, including ethylene, propylene, 1-butene, butadiene, oxiranes such as ethylene oxide, propylene oxide, and the like, or combinations thereof. Of the coordination polymerizable monomers, it is desirable to use ethylene or propylene.

The copolymerization of the macromer with this free-radical polymerizable monomer requires a free-radical catalyst such as azobisisobutyronitrile (AIBN), peroxides such as benzoyl peroxide, tert-butyl hydroperoxide, tert-butyl peroctoate, as well as various oxidation-reduction radical initiators such as Fenton's reagent ($H_2O_2 + Fe^{+2}$) and the like. Catalysts for the copolymerization of the macromer and a cationic polymerizable monomer are Lewis acid catalysts and heavy metal salts of non-nucleophilic counter anions such as described above for the preparation of the macromer. Catalysts for the copolymerization of the macromer and an anionic polymerizable monomer are RLi, R'Na where R is butyl and secondary butyl and where R' is naphthalene, as well as alkali metals such as Li, Na, and K. Catalysts for the copolymerization of the macromer and a coordination polymerizable monomer are any coordination catalyst described in *Coordination Polymerization* Ed. by J. C. W. Chien, Academic Press, Inc. 1975, such as $TiCl_4/Et_2AlCl$.

The reaction may occur with the macromer and the copolymerizable monomer in a suitable organic solvent in which both are soluable, such as toluene, benzene and the like. The atmospheric conditions are an inert atmosphere free of oxygen. The temperature of copolymerization is from about −20 degrees C to about 180 degrees C, depending upon the copolymerization reaction mechanism, as is well known to those skilled in the art. For free-radical copolymerization, 50 degrees C is desirable.

The concentration of the macromer may range from about $5.0 \times 10^{-2}$ moles to about $5.0 \times 10^{-7}$ moles per mole of copolymerizable monomer. Desirably, the range of concentration is from about $1.0 \times 10^{-5}$ to about $1.0 \times 10^{-6}$ moles per mole of copolymerizable monomer. Preferably, the macromer concentration is about $5.0 \times 10^{-6}$ moles per mole of copolymerizable monomer.

The concentration of catalyst is from about $1.0 \times 10^{-6}$ moles to about 0.1 moles per mole of copolymerizable monomer. Desirably, the catalyst concentration is from about $1.0 \times 10^{-4}$ to about 0.1 moles per mole of copolymerizable monomer, when free-radical copolymerizable monomers are used. Desirably, the cationic copolymerization catalyst concentration is from about $1 \times 10^{-5}$ to about 0.2 moles per mole of copolymerizaiton catalyst concentration is from about $1 \times 10^{-6}$ to about $1 \times 10^{-2}$ moles per mole of copolymerizable monomer. Desirably, the coordination copolymerization catalyst concentration is from about $1 \times 10^{-6}$ to about $5 \times 10^{-2}$ moles per mole of copolymerizable monomer. Desirably, the macromer, monomer, and catalyst are dissolved in about 9.0 moles of solvent per monomer. Preferably when free-radical polymerizable monomers are used the macromer, monomer, and catalyst are dissolved in about 1.85 moles of toluene per mole of free-radical polymerization monomer.

When the macromer is produced according to the above methods, and poly(isobutenylstyrene) is synthesized, this may be reacted with a free-radical polymerizable monomer such as butyl acrylate or methyl methacrylate to form the following copolymers: poly(butylacrylate-g-isobutylene) or poly(methyl methacrylate-g-isobutylene). Generally, the graft copolymer produced according to this invention is poly(free-radical polymerizable monomer-g-cationically prepared macromer).

Figure 3:
FIG. 3 is a compilation of three nuclear-magnetic resonance spectra demonstrating the formation of the graft copolymer of the present invention, having a backbone of one polymer and branch of the second polymer.
Figure 3:
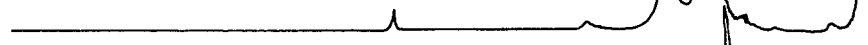
Figure 3:
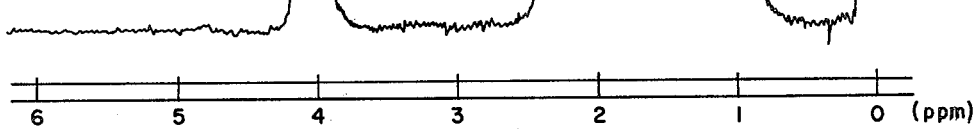

The synthesis of the graft copolymer of the present invention may be demonstrated by a comparison of nuclear magnetic resonance graphs such as those seen in FIG. 3. For a graft copolymer prepared from butyl acrylate and poly(isobutenylstyrene), the nuclear magnetic resonance of the graft copolymer should reflect the combination of the polymers comprising the backbone and the graft. Examining FIG. 3, it is apparent that the combination of the $H^{+1}NMR$ for poly (butylacrylate), poly(isobutylene), and poly(butylacrylate-g-isobutylene) indicates the existence of a polybutyl acrylate backbone and a polyisobutylene graft. Therefore, the production of the preferred graft copolymer of the present invention has been identified by NMR studies to isolate the backbone polymer and the graft polymer, as seen in FIG. 3.

As described above, another cationically polymerizable monomer is tetrahydrofuran. In the presence of a catalyst such as $AgPCl_6^-$, no discernible polymer is produced. However, in the presence of that catalyst and a vinyl-substituted hydrocarbon halide such as vinyl benzyl chloride, a macromolecular monomer containing tetrahydrofuran was produced, having a yield of about 86 percent. Because tetrahydrofuran requires cationic initiation, the vinyl benzyl chloride provides the vinyl benzyl cation upon ionization by the $AgPl_6^-$. Upon reaction of the tetrahydrofuran with the vinyl benzyl cation, the poly(tetrahydrofurylstyrene) is produced.

INDUSTRIAL APPLICABILITY

The production of a graft copolymer utilizing macromer copolymerization provides a random copolymerization of the free-radical polymerizable monomer with the macromer having cationically polymerizable monomers contained therein. Depending upon the monomers selected, the graft copolymer may be a thermoplastic elastomer having two separate glass transition temperatures, one in the glassy phase and another in the rubbery phase. Otherwise, the glass transition temperatures may be both in the rubbery phase. Depending upon the monomers selected, a variety of graft copolymers for specific industrial functions may be produced. These polymers are useful for impact resistant theremoplastics, blending agents, adhesives, and other purposes.

Employing the cationic polymerizing catalyst and the cationic macromer preparation process, monomers previously excluded from macromer synthesis may now be formed for the above uses. These cationic techniques permit any cationically polymerizable monomer to synthesize with any vinyl-substituted hydrocarbon halide to form a cationically prepared macromer, which in turn may polymerize with any copolymerizable monomer to form a wide variety of graft copolymers.

In the preferred embodiment, the snythesis of poly(isobutenylstyrene) macromer with either butyl acrylate or methyl methacrylate may show the distinct glass transition temperatures vital for proper blending of the graft copolymer. Referring to FIG. 4, a graph showing DSC scans, the comparison of the glass transition temperatures for the graft copolymers of the present invention with their constituent groups may be seen. Line 3 is the DSC scan for poly(isobutenylstyrene) macromer, while scan 2 and scan 4 are for poly(butylacrylate) and poly(methyl methacrylate), respectively. The DSC scan of one graft copolymer, poly(butyl acrylate-g-isobutylene) is shown in line 1, while the DSC scan for poly(methyl methacrylate-g-isobutylene) is shown on line 5. The presence of two distinct glass transition temperatures for these graft copolymers of the present invention demonstrate the industrial applicability of the graft copolymers, in applications where toughened or impact resistant thermoplastics are used. It is seen that poly(butyl acrylate-g-isobutylene) has both glass transition temperature in the rubbery range, which renders that graft copolymer useful for blending poly(butyl acrylate) rubber with butyl rubber. In contrast, the glass transition temperatures of poly(methyl methacrylate-g-isobutylene) are widely divergent. This renders the graft copolymer particularly useful as impact resistant poly(methyl methacrylate).

While in accordance with the patent statutes, the best mode for carrying out the invention has been provided, it is to be understood that the invention is not limited thereto or thereby. Consequently, for an understanding of the scope of the invention, reference is had to the following claims.

What is claimed is:

1. A macromolecular monomer comprising the reaction product of a cationically polymerizable monomer, said monomer being isobutylene, and a vinyl substituted hydrocarbon halide having the formula

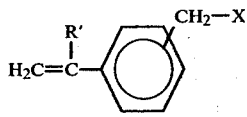

where R' is a hydrocarbon having from 1 to 18 carbon atoms, and where X is selected from the group consisting of F, Cl, Br, and I,
   in said reaction the amount of said vinyl substituted hydrocarbon halide is from about 5.0 moles to about $1.0 \times 10^{-5}$ moles per mole of said isobutylene monomer, and
   wherein said macromolecular monomer has polymerizable head groups, said polymerizable head groups being vinyl or substituted vinyl groups.

2. A macromolecular monomer, according to claim 1, wherein said vinyl-substituted hydrocarbon halide and said isobutylene monomer react in the presence of a cationic polymerization catalyst, said catalysts being a Lewis acid catalyst, said catalyst present in a concentration from about 1.0 moles to about $1.0 \times 10^{-5}$ moles per mole of said isobutylene monomer.

3. A macromolecular monomer, according to claim 2, wherein reaction occurs at from about +30 degrees C. to about −100 degrees C, wherein said catalyst is selected from the group consisting of trimethylaluminum, triethylaluminum, diethylaluminum chloride, ethylaluminum dichloride, ethylaluminum sesquihalide, diisobutylaluminum chloride, boron trichloride and combinations thereof.

4. A macromolecular monomer, according to claim 3, wherein said hydrocarbon halide is vinyl benzyl chloride.

5. A macromolecular monomer according to claim 4, wherein said reaction occurs in a nitrogen atmosphere.

6. A macromolecular monomer according to claim 5, including carrying out said reaction in the presence of from about 0.0001 to about 0.01 moles of water per mole of said catalyst.

7. A macromolecular monomer according to claim 6, wherein said catalyst is trimethylaluminum.

8. A macromolecular monomer according to claim 3, 4, 5, 6, or 7, wherein the number average molecular weight ranges from about 5,000 to about 100,000.

9. A macromolecular monomer according to claim 3, 4, 5, 6, or 7, wherein in said reaction said vinyl-substituted hydrocarbon halide had a concentration from about $3.0 \times 10^{-2}$ moles to about $5.0 \times 10^{-4}$ moles per mole of said cationically polymerizable monomer, and wherein the amount of said catalyst is from about 0.2 to about $1.0 \times 10^{-3}$ moles per mole of said isobutylene monomer.

10. A macromolecular monomer, according to claim 3, 4, 5, 6, or 7, wherein in said reaction said vinyl-substituted hydrocarbon halide has a concentration of from about 0.01 to about $5 \times 10^{-3}$ moles per mole of said cationically polymerizable monomer, and wherein the amount of said catalyst is from about 0.1 to about 0.2 moles per mole of said isobutylene monomer.

11. A method for the production of a macromolecular monomer produced by cationic polymerization, comprising:
   (a) charging from about 5.0 moles to about $1 \times 10^{-5}$ of a vinyl-substituted hydrocarbon halide into a vessel containing about 1 mole of a cationically polymerizable monomer, said monomer being isobutylene, and about 1.0 moles to about $1.0 \times 10^{-5}$ moles of a cationic polymerizing catalyst, said vinyl-substituted hydrocarbon halide having the formula

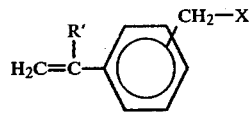

wherein R' is hydrogen or a hydrocarbon having from 1 to 18 carbon atoms, and
   (b) reacting said hydrocarbon halide and said monomer in the presence of said catalyst at a temperature from about −100° C. to about 30° C. and under $N_2$ atmosphere to form a cationically prepared macromolecular monomer having a molecular weight of from about 5,000 to about 100,000.

12. A method according to claim 11, wherein said catalyst is selected from the group consisting of trimethylaluminum, tiethylaluminum, trimethylaluminum and water, diethylaluminum chloride, ethylaluminum sesquihalide, ethylaluminum dichloride, diisobutylaluminum chloride, boron trichloride, and combinations thereof.

13. A macromolecular monomer, comprising: a compound having the formula

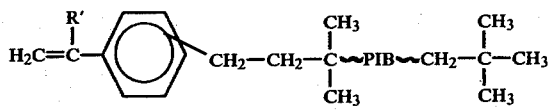

wherein R' is hydrogen or a hydrocarbon having from 1 to 18 carbon atoms, and wherein said compound has a number average molecular weight of from about 5,000 to about 100,000.

14. A macromolecular monomer according to claim 13, wherein R' is hydrogen.

15. A method according to claim 12, wherein said vinyl substituted hydrocarbon halide is vinyl benzyl chloride.

16. A method according to claim 15, including the step of adding from about 0.0001 to about 0.01 moles of water per mole of said catalyst.

17. A method according to claim 16, wherein said catalyst is trimethylaluminum.

18. A method according to claim 15, 16, or 17, wherein the amount of said vinyl-substituted hydrocarbon halide ranges from about $3.0 \times 10^{-2}$ moles to about $5.0 \times 10^{-4}$ moles per mole of said isobutylene and wherein the amount of said catalysts ranges from about 0.2 moles to about $1.0 \times 10^{-3}$ moles per mole of said isobutylene monomer.

* * * * *